United States Patent
Kenney

[15] 3,692,121
[45] Sept. 19, 1972

[54] HINGE LOCKING MEANS FOR A FOLDABLE AUXILIARY TOOL FRAME

[72] Inventor: William D. Kenney, Meridian, Miss.
[73] Assignee: Midland Manufacturing Company, Inc.
[22] Filed: Nov. 2, 1970
[21] Appl. No.: 85,894

[52] U.S. Cl. .................172/456, 172/568, 280/412, 16/146, 292/201
[51] Int. Cl. ....................A01b 65/02, A01b 63/32
[58] Field of Search.................172/311, 456, 568; 16/145–147; 244/49, 279, 291, 293, 298, 299; 49/199; 182/22–23, 104, 158, 163; 280/411–413; 292/96, 127, 195, 201, 227; 298/23; 214/307

[56] References Cited

UNITED STATES PATENTS

| | | | |
|---|---|---|---|
| 3,650,333 | 3/1972 | Fueslein | 172/568 |
| 1,404,544 | 1/1922 | Rettig | 172/456 |
| 2,260,080 | 10/1941 | Lane | 49/199 |
| 2,719,682 | 10/1955 | Handel | 244/49 |
| 2,972,385 | 2/1961 | Walberg | 172/568 |
| 3,568,777 | 3/1971 | Hook | 172/456 |

Primary Examiner—Robert E. Pulfrey
Assistant Examiner—C. W. Hanor
Attorney—Jennings, Carter & Thompson

[57] ABSTRACT

An earth working implement comprising a main frame which may carry earth working tools, together with foldable extendable side gangs of working tools. The invention is particularly directed to means to raise, lower, and lock the wing gangs in positive manner when in the working position. The invention embodies mechanism which permits the raising, lowering, locking and unlocking to be accomplished by a single motor such for instance, as a fluid pressure cylinder. The apparatus may be tractor drawn and the controls for the various cylinders may be located in easy reach of the tractor operator.

5 Claims, 8 Drawing Figures

INVENTOR.
William D. Kenney
BY
Jennings Carter & Thompson
Attorneys

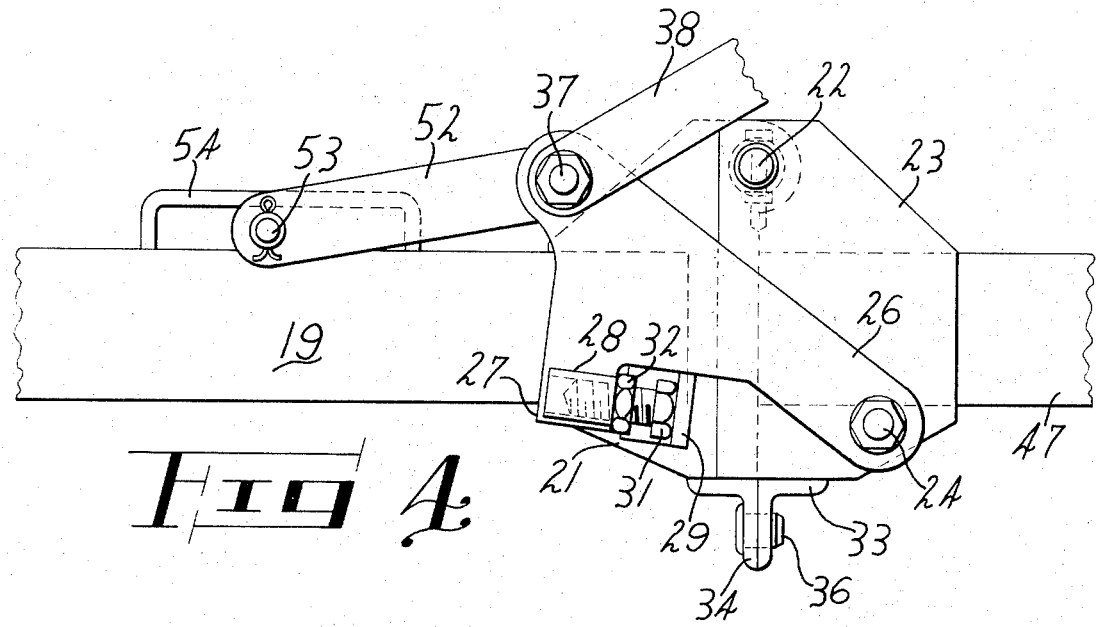
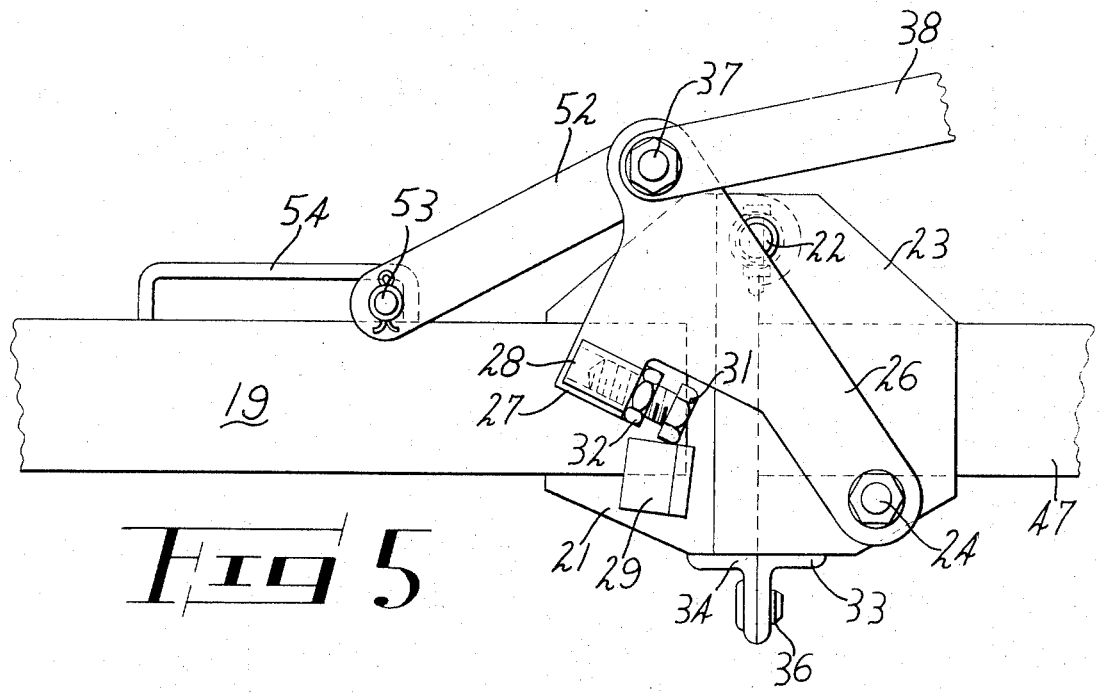

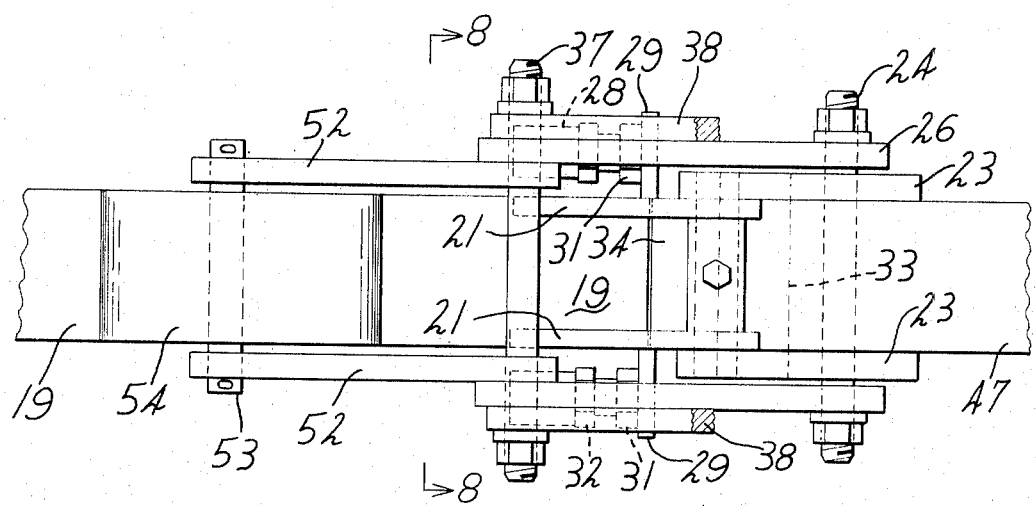
Fig 7
Fig 6
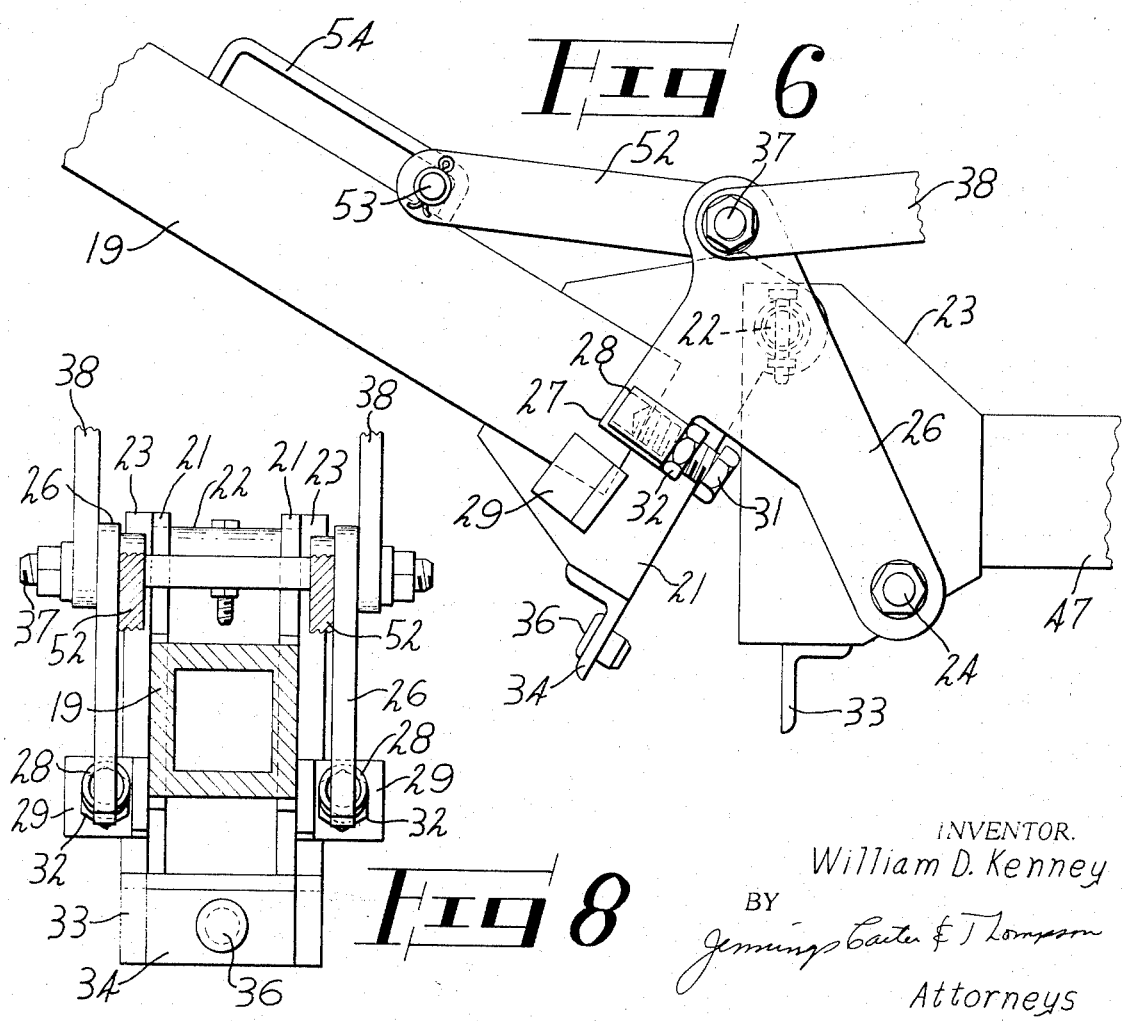
Fig 8
INVENTOR.
William D. Kenney
BY
Jennings Carter & Thompson
Attorneys

HINGE LOCKING MEANS FOR A FOLDABLE AUXILIARY TOOL FRAME

This invention relates particularly to earth working tools such as tandem type disc harrows of wide cutting swaths.

In the art to which my invention pertains it is known to provide earth working tools such as disc harrows which, in fully extended position, are some 18 to 21 feet in width. Most of these prior art tools have outer gangs or sets of implements hinged to a main frame and foldable upward and over on top and toward the center of the main frame, thus reducing the width to about 13 to 14 feet. This permits the unit to be transported over public roadways and further has the advantage of adding more weight to the reduced cutting width for better penetration of the soil in those areas which are more difficult to cut than other areas. Insofar as I am aware the foldable elements of prior apparatus have been operated manually, sometimes with the help of various types of spring arrangements. The locking and unlocking devices for holding such prior art sections in operating position have been manipulated manually with the aid of hand tools. These manual operations, including unlocking, folding, extending, and relocking are time consuming and in some instances require considerable manual effort. In addition, these heavy devices are a source of potential injury to the operator.

In view of the foregoing an object of my invention is to provide an earth working implement which may have a main frame which carries a plurality of earth working tools, and one or more foldable, extensible sections which permit the width of the apparatus to be increased or decreased at will, together with improved operating mechanisms for such foldable or extensible sections which permit all of the operations incident thereto to be powered from a single source, for instance, a fluid pressure cylinder.

More in detail, I propose to pivotally mount the side frame extensions which carry the earth working tools to a side of the main frame and to associate with said pivoted mechanism an improved form of locking bar arrangement for moving the same, the locking bar being pivoted also to the main frame at one end and to the source of power at the other, together with the provision of a lost motion connection between the said power mechanism and the side frame extension, whereby when lowered, the locking bars automatically hold the side extension tools into working contact with the ground and yet, when the power is applied for raising, the first motion thereof is to unlock the mechanism, followed by subsequent raising of the side extensions.

Apparatus illustrating features of my invention is shown in the accompanying drawings forming a part of this application in which:

FIG. 4 is an enlarged detail side elevational view of a portion of the raising and lowering mechanism for the side frame assembly with the parts in fully locked position;

FIG. 5 is a view corresponding to FIG. 4 with the parts in the position assumed just after the mechanism is unlocked but prior to raising the side extension;

FIG. 6 is a view with the side extension partially raised;

FIG. 7 is a plan view with the parts in lowered, locked position; and,

FIG. 8 is a detail sectional view taken generally along line 8—8 of FIG. 7.

Figure 1:
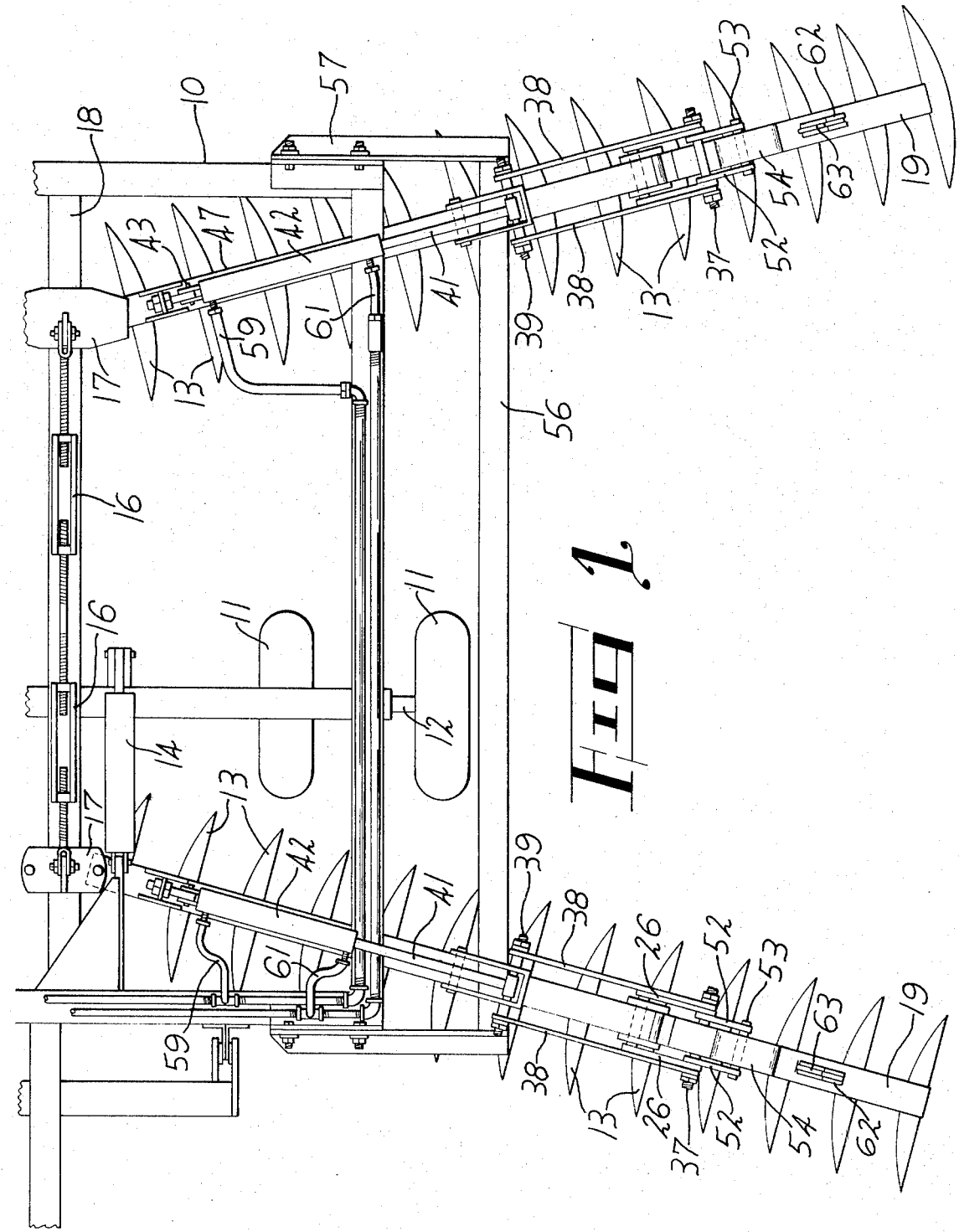
FIG. 1 is a plan view of one-half of a complete earth working implement in which the tools are discs, the parts being shown in working, locked position.

Referring now to the drawings for a better understanding of my invention I illustrate the same in association with a main tool frame 10. The tool frame may be mounted, selectively, to be supported by pneumatic tires 11 on an axle 12 or, with the tools 13 thereof in operating, earth working position. As illustrated the tools may be discs. By means of a fluid pressure cylinder 14 the entire apparatus may be raised so that it is solely supported on the wheels 11, in a manner well known in the art, as by means of an eccentric axle. Furthermore, a turn buckle arrangement 16 and sliding bracket 17, on an inboard frame member 18, together with other mechanism presently to be described, permit the angularity of the line of earth working tools to be varied, transversely of the apparatus.

At 19 I illustrate an extension frame for a set of earth working tools and, through a pair of hinge plates 21, welded to the end of the frame 19, the plates 21 are pivotally connected at 22 inside of a pair of cooperating plates 23 welded to the outer end of the gang frame 47.

Pivoted at 24 to the plate 23, on each side of said plates 23 are locking arms 26. Intermediate their ends the locking arms are provided with lateral extensions 27 and secured to these extensions are threaded tube nuts 28.

Secured to the pivoted end of the outer frame 19, downwardly from pivot point 22 and outwardly of pivot point 24 are locking lugs 29. Threadably received in the tube nuts 28 are headed bolts 31 provided with lock nuts 32. When the parts are down and locked, as for instance in FIG. 4, it will be apparent that the heads of the bolts 31 lie in the path of the locking lugs 29, thus preventing the frame 19 from pivoting upwardly about the pivot point 22.

Secured beneath the plates 23 is a length of angle iron 33. Secured to the bottoms of the plates 21, but short enough not to bind on the lower, outer edges of the plates 23 is a second piece of angle iron 34. A dial pin 36 may be carried by the angle 34 to center the parts when they come together as shown in FIGS. 4 and 5, and the angles act as stops to prevent further downward movement of the frame 19 about its pivot 22.

The upper ends of the locking arms 26 carry a cross pin 37. Pivotally connected to the pin 37 is a pair of inwardly extending links 38 and these are connected to a cross pin 39 fitting in the end of a piston rod 41 carried by a fluid pressure cylinder 42. The cylinder 42 is pivotally mounted at 43 to an attachment 44 which in turn is welded to a frame 46 carried by a main gang frame 47.

Figure 2:
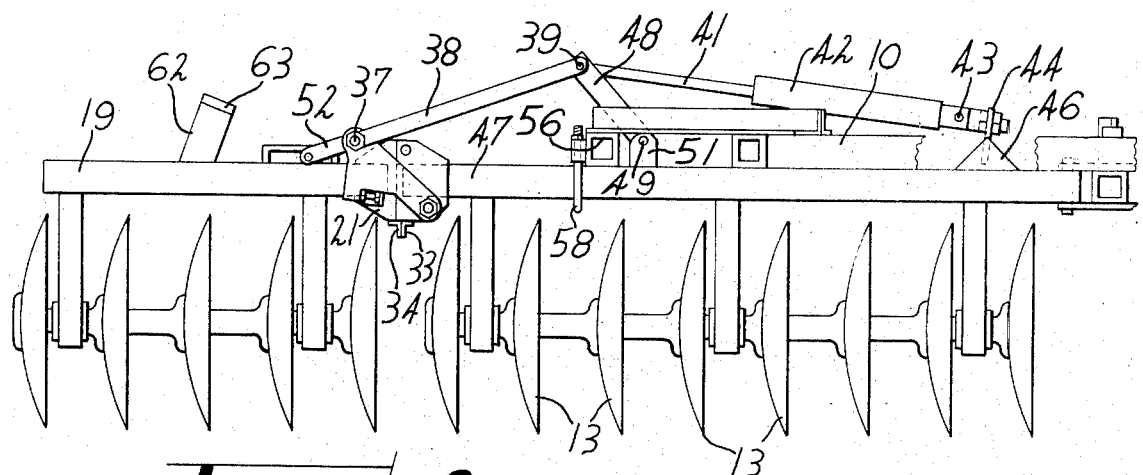
FIG. 2 is a rear elevational view of one-half of the main frame and one of the side extension frames in working, locked position.
Figure 3:
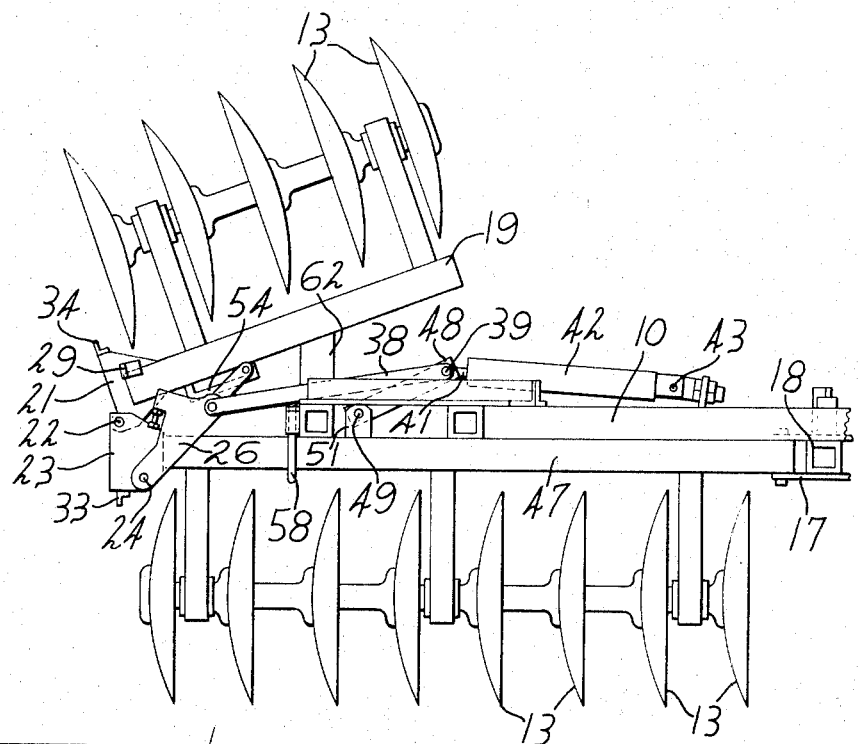
FIG. 3 is a view corresponding to FIG. 2 with the side extension raised.

As best seen in FIGS. 2 and 3, the pin 39 is pivoted to the upper ends of a pair of links 48 which in turn are pivoted at 49 to a pair of upstanding brackets 51 carried by the frame 47.

The pin 37 also is pivotally connected to a pair of links 52, and the links 52 are cross connected by a pin 53. The pin 53 is slidable longitudinally of the frame member 19, but held captive thereon by means of a U-shaped strap 54 welded on top of the frame 19.

Reverting again to angular adjustment feature of the entire gangs of implements, secured to an extension frame 56 carried by transverse members 57 secured to the main frame 10 are U-bolts 58 which in effect form a pivotal connection at that point for the entire transversely extending sets of tools. Thus, when turn buckles 16 are manipulated the inner end of the entire assembly moves longitudinally, and U-bolt 58 permits the same to pivot, thus to vary the angle between the longitudinal axis of the tool frame and the fore and aft center line of the apparatus.

With the foregoing in mind the method of constructing and using my improved apparatus together with the several advantages thereof may be now more fully explained and understood. It will be understood that the various hydraulic cylinders are under control of the operator of the towing vehicle, not shown, by means of suitable valves, piping, and a source of fluid under pressure also not shown. For instance, and by reference to FIG. 1 of the drawings we show hydraulic lines 59 and 61 entering each end of the cylinder 42, so that these cylinders are double acting. Starting with the parts in the position of FIGS. 1, 2, 4, 7 and 8, it will be seen that thus positioned the bolts 31 lie in the paths of movement of the locking lugs 29, this being because they are carried by the frame 19 which must pivot about the pivot 22 if the outboard, pivoted gangs of tools are to move out of the ground. In this position the pivoted frames carrying their tools are held positively in down, earth working position. If it be assumed that it is now desired to raise one of the wings, the appropriate hydraulic cylinder is energized whereupon the parts move from the position of FIG. 4, first to the position of FIG. 5. That is to say, righthand pivotal movement of the locking arms about their pivots 24, as viewed in FIGS. 4 and 5, first moves the bolts 31 out of the paths of the lugs 29. This moves the pin 53 from the position of FIG. 4 to a position where it engages the inner end of the strap 54. Further continued movement to the right of the arms 38 (which are connected to the cylinder 42), causes the parts to move from the position of FIG. 5 to the position of FIG. 6, and thence on through that position to a point where the frame 19 passes over the center of gravity relative to its pivot point 22. When this happens the frame falls by gravity, there being stop members 62 which come to rest on top of the frame members 56. If desired the stands or frame members 62 may be equipped with cushioning material 63 to absorb the shock. Thus, with a single motion of the piston rod of the cylinder 42 the first action is to unlock the pivotal frame section 19 for upward movement and then, by continued movement to raise the same to a position where by gravity it comes to rest as shown in FIG. 3.

If desired, the hydraulic line at each end of the cylinder may be equipped with restrictors so that when the center of gravity of the frame 19 and the implements carried thereby pass over the center of the pivot pin 22, the movement from there on is by gravity and is snubbed, hydraulically, by the restrictors.

From the foregoing it will be seen that I have devised an improved, simple and automatic locking means for pivoted, raisable sections of earth working implements. My invention eliminates all manual labor, and eliminates the necessity of the driver having to leave the seat of the tractor to insert pins, locks, or the like to hold the earth working implements on the extension frame in working position. It will be understood that the tendancy of tools such as discs, when working, is to ride out of the ground. By the provision of the adjustable stop members in the form of the bolts 31, which cooperate with the stop lugs 29, I obtain extremely close adjustment firmly to hold the frame 19 and its implements in working engagement with the ground. The lost motion connection between the lifting arms-hydraulic cylinder-frame 19 permits the use of a single power means for each of the extensible frames for unlocking, locking, raising, and lowering the same.

In actual practice my invention has proven extremely practical and satisfactory in every manner. I have not only eliminated the manual labor involved, but likewise have eliminated the hazards incident to raising and lowering these heavy, cumbersome sections.

While I have shown my invention in but one form, it will be obvious to those skilled in the art that it is not so limited, but is susceptible of various other changes and modifications without departing from the spirit thereof.

What I claim is:

1. In apparatus for working the soil which includes tools which must be held down when in working position,
   a. a translatable main supporting frame,
   b. a tool carrying frame pivotally connected to the main frame for movement from a position with the tools thereon in earth engaging working position to a raised, inoperative position,
   c. means for locking the tool carrying frame in operating position and for moving the same to raised position comprising,
      1. a locking arm pivoted adjacent one end to said main frame at a position out of alignment with the axis of the pivotal connection for said tool carrying frame,
      2. power means operatively connected to said main frame and adjacent the other end of said locking arm to rock it about its pivot,
      3. a locking lug carried by the tool carrying frame and located, when the tool carrying frame is in working position, out of alignment with the axes of the pivot points of said locking arm and said connection for the tool carrying frame,
      4. a member on the locking arm intermediate the ends thereof disposed to engage said locking lug when the tool carrying frame is in said working position, thereby to lock the tool carrying frame against upward pivoting, and
   d. means to connect said power means to the tool carrying frame for raising and lowering the same including a lost motion connection between the power means and the tool carrying frame, whereby with the tool carrying frame in operating, locked position, pivotal movement of the locking arm removes said member thereon out of the path of movement of the locking lug prior to pivoting the tool carrying frame toward raised position, and vice versa.

2. Apparatus as defined in claim 1 in which the member on the locking arm is adjustable toward and from said lug, thereby to vary the operating clearances therebetween.

3. Apparatus as defined in claim 1 in which there is a pair of said locking arms which straddle the adjacent pivoted end of the tool carrying frame, said lost motion connection including a link pivoted at one of its ends to the ends of the locking arms remote from their pivotal connection to the frame, a cross pin in the other end of the link, and an elongated slotted connection on the tool carrying frame in which said pin slides during the locking and unlocking movement of the locking arms and in one end of which it bottoms during raising of the tool carrying frame.

4. For use in raising, lowering and positively locking in lowered, generally horizontal, working position a tool frame carrying earth working tools, which tool frame is pivoted adjacent its inner end to a main frame,
 a. a pair of locking arms pivotally mounted on the main frame at a point out of axial alignment with the axis of the pivotal mount of the tool frame to the main frame, said arms having upper portions straddling the tool frame adjacent its pivoted end and extending above the top of the same when the tool frame is in lowered, locked position,
 b. at least one outstanding locking lug operatively connected to the tool frame and positioned below and outwardly of the pivotal connection of the tool frame to the main frame,
 c. means on at least one of the locking arms engaging said outstanding lug when the apparatus is in lowered, locked position, thereby preventing the tool frame from pivoting upwardly,
 d. means operatively connected to the main frame and to the non-pivoted ends of said locking arms for pivoting them from locked toward unlocked position, and
 e. means operatively connecting the said locking arms to said tool carrying frame and effective, upon initial pivotal movement of the arms toward unlocking position, to move said lug engaging means out of the path of movement of said outstanding lug and upon continued subsequent pivotal movement of the arms operatively to engage the tool frame and pivot it upwardly to a raised, inoperative position.

5. Apparatus as defined in claim 4 in which the means operatively connecting the locking arms to the tool frame comprises a lost motion connection between the locking arms and the tool frame constructed and arranged to permit initial pivotal movement of the locking arms to move the lug engaging means out of the path of movement of the lug prior to raising the tool frame.

* * * * *